United States Patent
Guidry

(10) Patent No.: US 9,292,684 B2
(45) Date of Patent: Mar. 22, 2016

(54) SYSTEMS AND METHODS FOR SECURITY IN COMPUTER SYSTEMS

(71) Applicant: Michael Guidry, Miami, FL (US)

(72) Inventor: Michael Guidry, Miami, FL (US)

( * ) Notice: Subject to any disclaimer, the term of this patent is extended or adjusted under 35 U.S.C. 154(b) by 0 days.

(21) Appl. No.: 14/479,272

(22) Filed: Sep. 6, 2014

(65) Prior Publication Data

US 2015/0186296 A1    Jul. 2, 2015

Related U.S. Application Data

(60) Provisional application No. 61/874,949, filed on Sep. 6, 2013.

(51) Int. Cl.
*G06F 21/54* (2013.01)

(52) U.S. Cl.
CPC ...................................... *G06F 21/54* (2013.01)

(58) Field of Classification Search
CPC combination set(s) only.
See application file for complete search history.

(56) References Cited

U.S. PATENT DOCUMENTS

| | | | |
|---|---|---|---|
| 6,308,256 B1 | 10/2001 | Folmsbee | |
| 6,609,201 B1 | 8/2003 | Folmsbee | |
| 7,272,848 B1 | 9/2007 | Meyer et al. | |
| 7,415,618 B2 | 8/2008 | de Jong | |
| 7,797,702 B1 | 9/2010 | Ferrie | |
| 7,802,232 B2 | 9/2010 | Zorn et al. | |
| 7,831,838 B2 | 11/2010 | Marr et al. | |
| 8,205,262 B2 | 6/2012 | Bird | |
| 8,214,900 B1 | 7/2012 | Satish et al. | |
| 8,234,638 B2 | 7/2012 | Bird | |
| 8,321,931 B2 | 11/2012 | Zimmer et al. | |
| 8,392,725 B2 * | 3/2013 | McIntosh | G06F 9/3802 711/163 |
| 8,572,739 B1 | 10/2013 | Cruz et al. | |
| 8,613,084 B2 | 12/2013 | Dalcher | |
| 8,701,187 B2 | 4/2014 | Schluessler et al. | |
| 8,782,435 B1 | 7/2014 | Ghose | |
| 8,782,800 B2 | 7/2014 | Brennan et al. | |
| 8,943,592 B1 | 1/2015 | Mirski et al. | |
| 2004/0133777 A1 | 7/2004 | Kiriansky et al. | |
| 2006/0064488 A1 | 3/2006 | Ebert | |
| 2007/0027929 A1 | 2/2007 | Whelan | |
| 2007/0074046 A1 | 3/2007 | Czajkowski et al. | |
| 2007/0106981 A1 | 5/2007 | Bird | |
| 2008/0229117 A1 | 9/2008 | Shin et al. | |

(Continued)

OTHER PUBLICATIONS

Buchanan, Erik, et al., "Return-oriented Programming: Exploitation without Code Injection," [http://cseweb.ucsd.edu/~hovav/talks/blackhat08.html], Oct. 4, 2012, 12 pages.

(Continued)

*Primary Examiner* — Beemnet Dada
(74) *Attorney, Agent, or Firm* — Vierra Magen Marcus LLP

(57) ABSTRACT

Systems and methods are provided for the prevention and mitigation of security attacks in computer systems. Virtualization technology is provided and leveraged to prevent and mitigate exploits in the computer systems. For example, malicious code may be prevented from system execution by inhibiting the delivery of such code in a payload to system memory. In other examples, virtualization technology is leveraged to mask the computer system machine architecture. By masking or otherwise hiding the machine architecture, the delivery of payloads into memory by malicious users can be prevented. In this manner, even if exploits are identified and accessed by malicious users of code, the denial of payload delivery prevents the execution of malicious actions within the computer system.

17 Claims, 13 Drawing Sheets

(56) References Cited

U.S. PATENT DOCUMENTS

| | | |
|---|---|---|
| 2009/0313276 A1 | 12/2009 | Wataguchi |
| 2010/0005267 A1 | 1/2010 | Barde |
| 2010/0191959 A1* | 7/2010 | Czajkowski ............ G06F 21/14 713/155 |
| 2011/0145216 A1 | 6/2011 | Subramanya |
| 2012/0011491 A1 | 1/2012 | Eldar |
| 2012/0054744 A1 | 3/2012 | Singh et al. |
| 2012/0066516 A1 | 3/2012 | McIntosh et al. |
| 2012/0159193 A1 | 6/2012 | Spradlin |
| 2012/0216246 A1 | 8/2012 | Brennan et al. |
| 2013/0086299 A1 | 4/2013 | Epstein |
| 2013/0117843 A1 | 5/2013 | Komaromy et al. |
| 2013/0290662 A1 | 10/2013 | Teal |
| 2014/0181247 A1 | 6/2014 | Hindawi et al. |
| 2014/0344924 A1 | 11/2014 | McLachlan et al. |

OTHER PUBLICATIONS

Pappas, Vasilis, "kBouncer: Efficient and Transparent ROP Mitigation," Columbia University, Apr. 1, 2012, 8 pages.

Kharbutli, Mazen, et al., "Comprehensively and Efficiently Protecting the Heap," Intl. Symp. on Architecture Support for Programming Languages and Operating Systems, Oct. 2006, 12 pages.

* cited by examiner

SYSTEMS AND METHODS FOR SECURITY IN COMPUTER SYSTEMS

BACKGROUND OF THE INVENTION

The present application claims priority from U.S. Provisional Patent Application No. 61/874,949, entitled "SYSTEMS AND METHODS FOR SECURITY IN COMPUTER SYSTEMS," by Guidry, filed Sep. 6, 2013, incorporated by reference herein in its entirety.

BACKGROUND OF THE INVENTION

The disclosed technology is related to security in computer systems.

A basic computer system comprises computer hardware, an operating system, and one or more application programs. The computer hardware includes a processor, a memory, and one or more system buses that facilitate communication among the various components. The operating system is an interface between applications and the hardware layer of the computer system. The operating system includes various routines that manage the physical components of the computer system and their use by applications.

Computer programs are known to have vulnerabilities to various kinds of attacks. Attacks can be instituted and delivered over network connections such as the Internet, but also may come directly from someone with immediate access to a computer system. Computer viruses, worms, and trojan horses are all examples of different forms of attack. Attacks are generally implemented by installing unauthorized or malicious code into the programs and causing execution of the foreign code. For example, exploits may be created to force an application to execute code after an exploit has been triggered. The code may be considered a payload which is often prepared in memory before being triggered by the exploit.

DETAILED DESCRIPTION

Systems and methods are provided for the prevention and mitigation of security attacks in computer systems. In one embodiment, virtualization technology is provided and leveraged to prevent and mitigate exploits in the computer systems. For example, malicious code may be prevented from system execution by inhibiting the delivery of such code in a payload to system memory. In other examples, virtualization technology is leveraged to mask the computer system machine architecture. By masking or otherwise hiding the machine architecture, the delivery of payloads into memory by malicious users can be prevented. In this manner, even if exploits are identified and accessed by malicious users of code, the denial of payload delivery prevents the execution of malicious actions within the computer system.

Techniques are provided for using a virtualization layer to encrypt system opcodes and other code to blocks exploits using the system opcodes. For example, such techniques can modify system opcodes to prevent shell code exploits from executing the system opcodes. A pre-processor is provided in one example that disassembles system opcodes and translates them into an alternate system language. In one example, the translation is an encryption using a cryptographic encryption key. A translator accesses the translated opcodes when requested by the system, and translates them to their original form. The decrypted opcodes can then be transmitted to the CPU for processing. In this manner, any insertions or modifications to applications in main memory will be decrypted or reverse translated before processing. Because any modifications will not be pre-processed for encryption with the original code, they will be decrypted into useless data or instructions.

In another example, a complete operating system can be translated in advance. The translated operating system can sit in system memory in its encrypted form. A translator can be provided in the virtualization layer to translate the encrypted operating system components when requested by the system. In one embodiment, the virtualization layer comprises a hypervisor configured to provide the pre-processor and/or translator. In another example, the pre-processor encrypts areas of memories. For example, the areas of memories can be associated with a specific heap or specific processes of the system. The pre-processor can identify areas of memory that are encrypted using a specific bit in the memory array such as an identified bit in each page.

Figure 1:
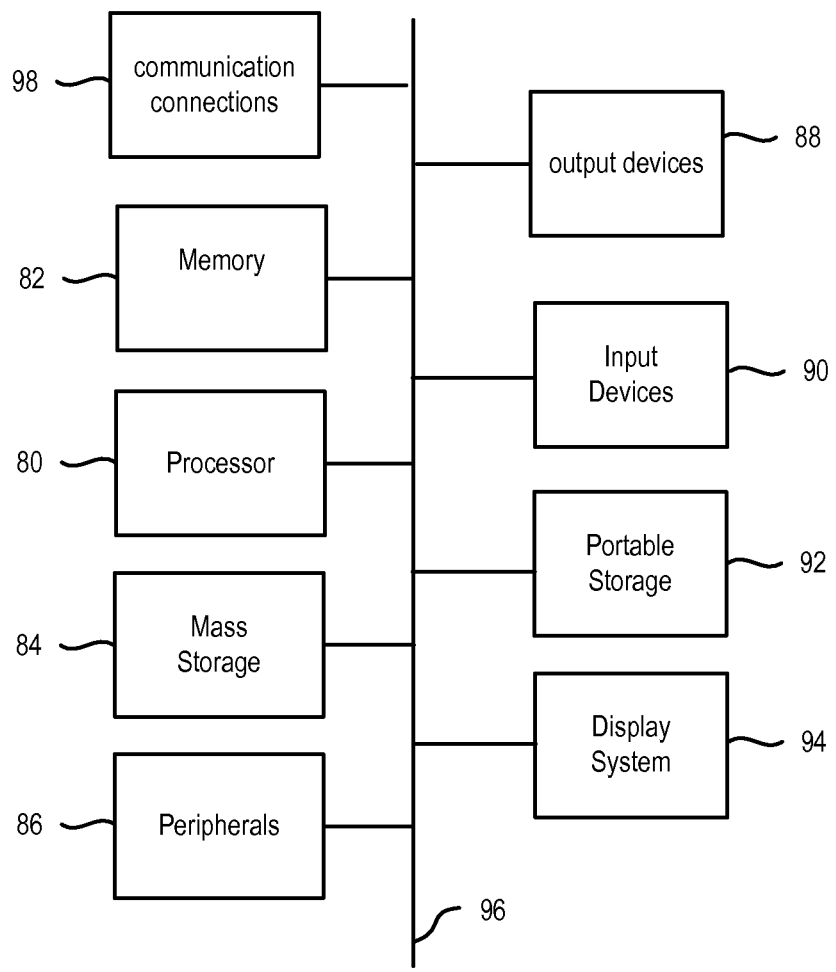
FIG. 1 is a simplified block diagram of a computing device that can be used to implement various embodiments of the disclosed technology.

FIG. 1 is a high level block diagram of a computing system in which embodiments of the disclosed technology may be implemented. The computing system of FIG. 1 includes processor 80, memory 82, mass storage device 84, peripherals 86, output devices 88, input devices 90, portable storage 92, and display system 94. For purposes of simplicity, the components shown in FIG. 1 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 1. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 1 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 1 are those typically found in computing systems suitable for use with the technology described herein, and are intended to represent a broad category of such computer components that are well known in the art. Many different bus configurations, network platforms, operating systems can be used. The technology described herein is not limited to any particular computing system. Other embodiments may not include all of the hardware components shown in FIG. 1 and/or may include additional hardware components to those shown. The computing system can be a personal desktop computer, workstation, server, mini-computer, main frame, laptop computer, handheld computer, mobile computer, cellular telephone, smartphone, television set-top box, or other computing device. Many different bus configurations, network platforms, operating systems can be used. The technology described herein is not limited to any particular computing system.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Figure 2:
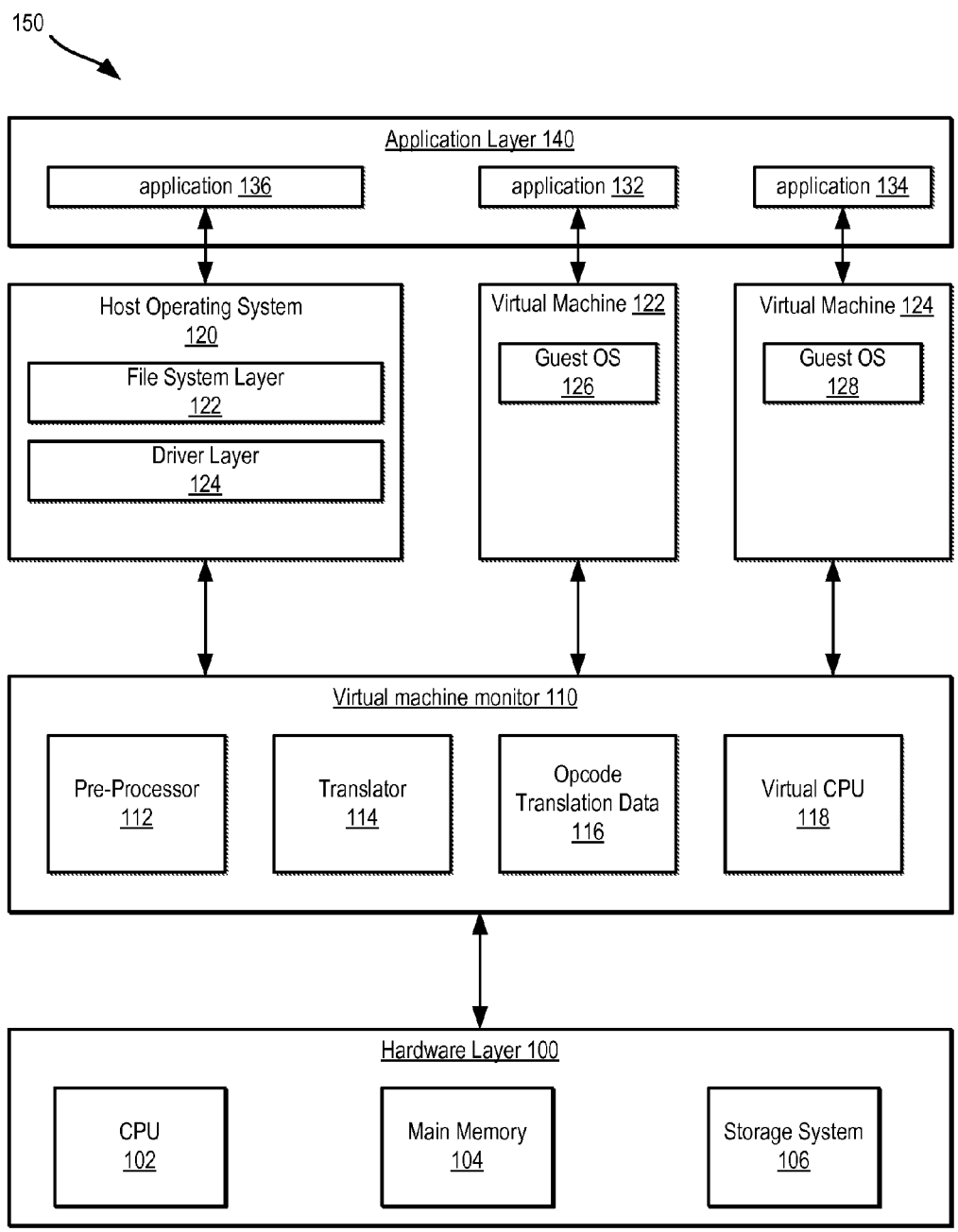
FIG. 2 is a block diagram of a portion of a computing device depicting code translation in accordance with one embodiment.

FIG. 2 is a block diagram of a computing system 150 describing techniques for mitigating system exploits in accordance with one embodiment. For example, the computer system of FIG. 2 may be configured to provide opcode translation in an effort to mask the underlying system architecture to mitigate exploits from leveraging any perceived system vulnerabilities. In FIG. 2, a hardware layer 100 includes a central processing unit (CPU) 104, a main memory 104, and a storage system 106. The hardware components can be connected via a single bus or through one or more data transport means. The hardware layer may include additional components such as those depicted in FIG. 2.

A host operating system (OS) 120 is implemented for general management of the computing system 150. The operating system interfaces between the hardware layer and an application layer 140 for management of the various physical resources of the computing system. The operating system may include various schedulers, drivers, etc. that allocate usage of CPU to the application layer 140. In FIG. 2, three exemplary applications 136, 132, and 134 are shown for explanatory purposes although any number of applications may be executed by the computing system. The operating system includes resource schedulers that reside between a core kernel layer/file system layer 122 and a driver layer 124 including various hardware drivers for supporting the hardware components coupled to the computing system.

A virtualization layer interfaces between hardware layer 100 and the software layers to present the hardware layer to multiple operating systems such that each operating system appears to have direct access to the resources made available to it. The virtualization layer includes a virtual machine monitor 110 (VMM) the enables software applications to run in isolated environments on the shared hardware layer. The VMM itself is a software layer running on the hardware layer that provides an abstraction of the computing system to the software layers. VMM 110 includes virtualized versions of the hardware resources that are shared at the operating system layer. The shared CPU 102 is virtualized and presented to the guest operating systems as virtual CPU 118. The shared storage system 106 and other resources in hardware layer 100 can be virtualized and presented to the guest operating systems also.

The operating system layer includes guest operating systems (OS) 126 and 128 in additional to host operating system 120. The guest operating systems reside in individual domains depicted as virtual machines 122 and 124.

The virtualization layer may include various components. For example, the virtualization includes a hypervisor in one embodiment. The hypervisor can create and run virtual machines as well as manage their execution and that of the guest operating systems. Moreover, the hypervisor may interface between the hardware layer and the operating system 120 to manage the physical and virtual resources of the computing system. The hypervisor can control memory access and application loading and execution. The hypervisor may directly run on the hardware layer to control the hardware and manage the guest operating systems. The hypervisor may also run within the host operating system 120 as a distinct second software level with the operating systems residing at a third level.

In FIG. 2, applications 136, 132, and 134 are depicted by way of example, but any number of applications may concurrently be running. The applications may be in an active executing state whereby CPU processing time is being allocated to a process for each application in one example. VMM 110 manages execution of applications 136, and 132, and 134. In this manner, the VMM is able to control memory and other resource requests relating to the applications.

In FIG. 2, pre-processor 112 and translator 114 are configured in VMM 110 to provide opcodes translation services for security within computing system 150. Note that pre-processor 112 and 114 may be directly configured within a host operating system, for example in a non-virtualized environment in other embodiments. When applications are loaded into main memory, from storage system 106 or over a network connection for example, VMM 110 manages execution to control system opcodes from exploits using the application. Pre-processor 112 translates the opcodes or and/or other CPU-level instructions in the application. Core system services can also be translated. Pre-processor 112 translates the opcodes using cryptographic encryption techniques in one embodiment, although other techniques may be used. In one embodiment, pre-processor 112 encrypts all applications in the application 140 using a single key. In other example, individual keys can be used to encrypt opcodes for different applications. The encryption key or keys can be generated, using a random number generator for example, on initial boot of computer system 150 or when individual keys are needed for individual applications.

Pre-processor 112 then stores the encrypted opcodes in main memory 104 for later execution by CPU 102. The pre-processor also generates opcodes translation data 116. In one example, opcode translation data includes a list or array identifying those opcodes that have been encrypted. The memory addresses corresponding to the encrypted opcodes are stored in one example.

When an application calls or otherwise requests execution of an opcode, translator 114 controls processing to provide a reverse translated opcode for CPU 102. Translator 114 can access opcodes translation data 116 to determine whether a requested opcode has been translated. Translator 114 can compare memory addresses in translation data 116 with the memory addresses of any received commands. If the translation data indicates that an opcode has not been translated, the translator passes the memory request to the CPU for processing. In one embodiment, the pre-processor 112 provides the opcode translation data to the CPU. The CPU can use the data to determine whether addresses are to be processed normally or sent to the translator 114 for processing.

If the translation data indicates that an opcode has been translated, the translator reverse translates the opcode and provides the reverse translated opcode to the CPU for processing. Translator 114 may determine an appropriate encryption key corresponding to the application accessing the memory location in one example.

Pre-processor 112 and translator 114 provide masking of the underlying machine architecture of computer system 150 by managing opcodes within the system to inhibit exploits. By translating the opcodes associated with applications 136, 132, and 134 before placing the applications into main memory 104, the pre-processor inhibits attackers from utilizing the system opcodes for malicious purposes. By encrypting the opcodes, for example, an attacker is unable to make meaningful use of the opcode even if the system is compromised to allow the attacker access to the opcode or other portion of the application in memory. Consider an example where code such as opcodes for application 136 have been translated before being written to main memory 104. If an attacker comprises system 150, they may gain access to main memory and modify code for application 136 being stored in memory. When the code for application 136 is executed, however, it will be reverse translated from main memory by translator 114 before being provided to CPU 102 for execution. The malicious code inserted by the attacker or the otherwise modified code will be reverse translated. Because the added or modified code was not initially translated by pre-processor 112, however, it will not reverse translate into executable or otherwise meaningful code for computer system 150. In this manner, the CPU will not properly execute the instructions or code designed by the attacker, effectively mitigating any exploits even where a system vulnerability is leveraged to insert or modify code.

Figure 3:
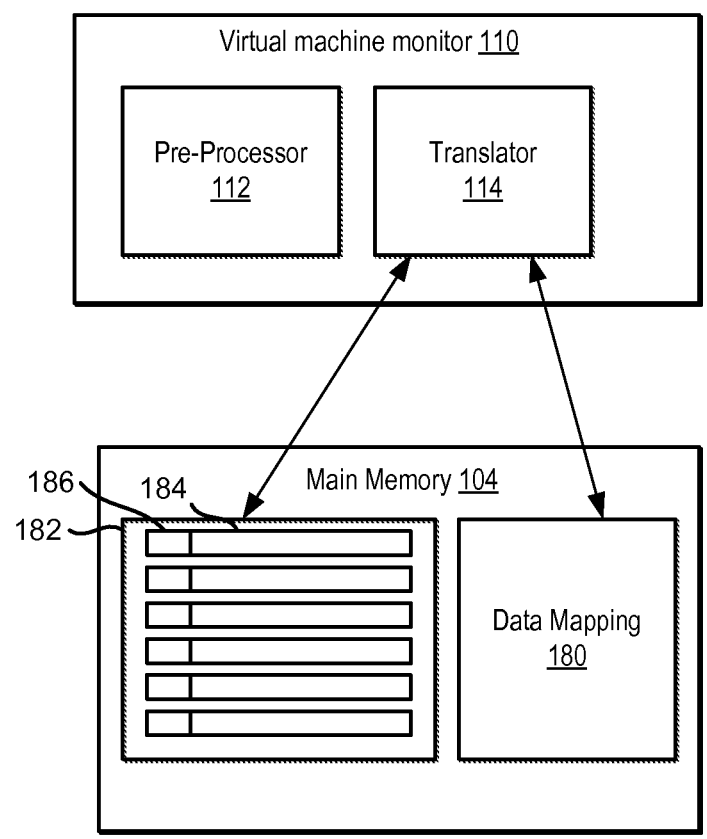
FIG. 3 is a block diagram of a portion of computing device depicting code translation in accordance with one embodiment.

FIG. 3 is a simplified block diagram depicting VMM 110, pre-processor 112, translator 114 and the translation of opcodes to provide computer system security in accordance with one embodiment. In the example of FIG. 3, opcode translation data 116 is not used. Instead, pre-processor 112 and translator 114 utilize one or more translation identifier (ID) bit(s) in memory to track whether opcodes have been encrypted.

In FIG. 3, a portion 182 of main memory organized into pages 184 is depicted for example. Each page 184 includes a translation ID bit 186. For example, the first bit of each page could be used a translation ID bit. More than one bit can be used in other examples and the placement of the identification bit(s) can be anywhere within a page. The translation ID bit stores a flag used to indicate whether the corresponding page has been translated by pre-processor 112. Accordingly, when an application is loaded into main memory 104, pre-processor 112 will translate the pages of the application before storing them into main memory. The pre-processor 112 may selectively translate certain pages or all pages. For example, the pre-processor 112 may only translate pages containing system opcodes in one example. If the pre-processor 112 translates a page writing to main memory, it will set the flag in translation id bit 186 to indicate that they page has been translated. Additionally, pre-processor 112 will write the original value from the translation ID bit to translation ID data mapping 180 in main memory for later use when reverse translating the page.

When an application requests execution of code from main memory, translator 114 checks the translation ID bit to determine if the flag indicating translation has been set. If the flag is set, the translator retrieves the original bit value from data mapping 180 and replaces the flag with the original data value. Translator 114 then reverse translates the page using the appropriate key and provides the code to CPU 102 for processing. Different orders of encryption/decryption and bit replacement may be used.

Figure 4:
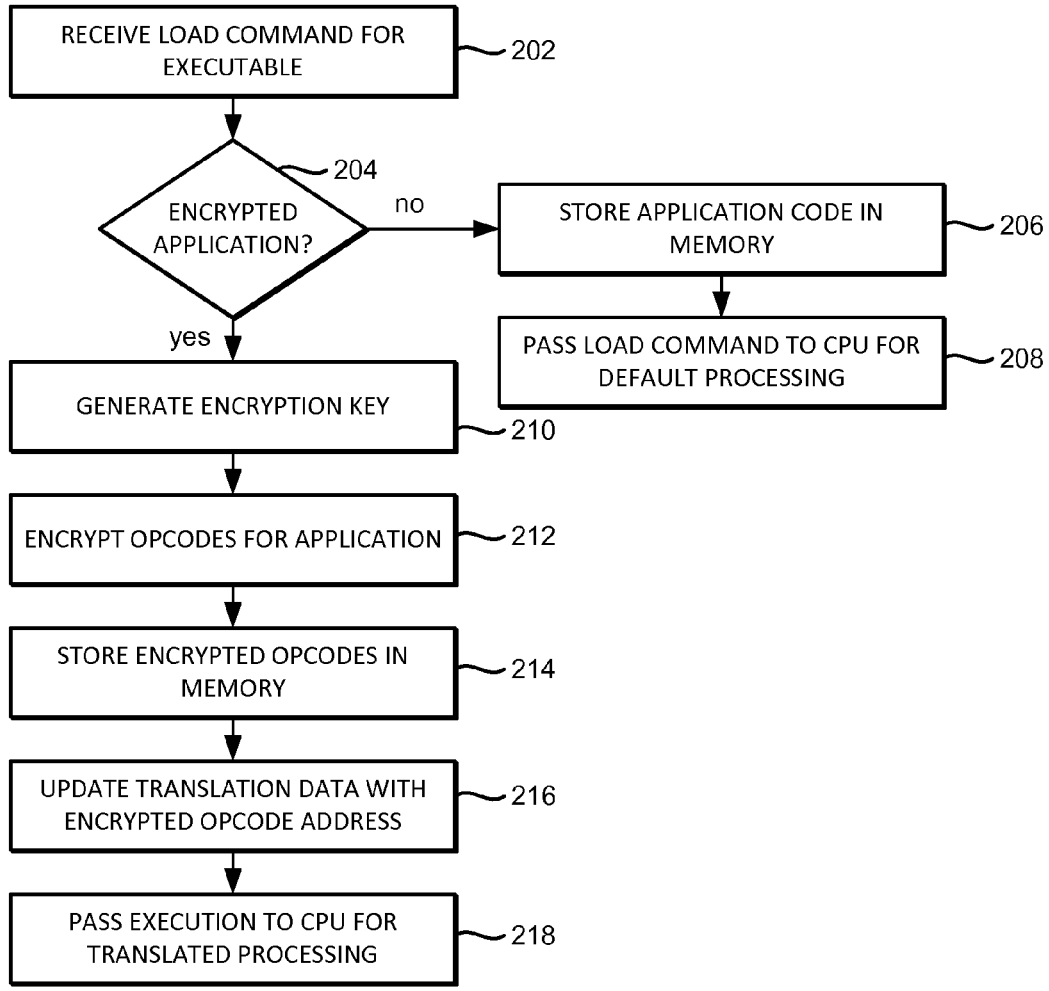
FIG. 4 is a flowchart that describes a process of translating code in accordance with one embodiment.

FIG. 4 is flowchart describing a process of encrypting opcodes in accordance with one embodiment. In one example, FIG. 4 can be performed by a pre-processor 112 in a virtualization layer. In another example, FIG. 4 may be performed by a pre-processor within an operating system or other implementation. At step 202, a load command associated with an executable or other application file is received. Step 202 can be performed in various manners. In a hypervisor or other example, step 202 may include monitoring load commands for all applications. At step 204, the computer system determines whether the application being loaded is to be encrypted. In some implementations, all applications may be encrypted, while in others only particular applications may be encrypted. The complete operating system may be encrypted in one example, as well as other high risk or high requirement processes. Moreover, groups of applications or a subset of processes within an application may be encrypted. For example, certain portions of an operating system or other application, such as those utilizing core system services, may be encrypted. In one example, only opcodes associated with an encrypted application may be encrypted in one example. In other example, only opcodes or other system services are encrypted. The pre-preprocessor may be configured to select any number of applications for encryption.

If the application is not to be encrypted, the application code is stored in main memory at step 206. At step 208, the load command is passed to the CPU for standard or default processing. For example, a hypervisor-based pre-processor may pass control of the application load and/or execution at step 208 to the CPU.

If the application is to be encrypted, the pre-processor generates an encryption key at step 210. Although shown as being performed for each load command, the encryption key may be generated at other times, for example at system boot. A single encryption key is used for multiple applications in one example. In another example, individual encryption keys can be generated for particular applications. At step 212, the pre-processor encrypts or otherwise translates the opcodes associated with the application using the generated encryption key. Various types of cryptographic encryption processes can be used. In one embodiment, the pre-processor may translate additional components of the application, such as other CPU commands for example or the complete application. The pre-processor stores the encrypted opcodes in main memory at step 214.

At step 216, the pre-processor generates or updates translation data identifying the encrypted opcodes. The pre-processor maintains a list or array of encrypted physical addresses in one embodiment. At step 218, the pre-processor passes further processing of the load command to the CPU.

Figure 5:
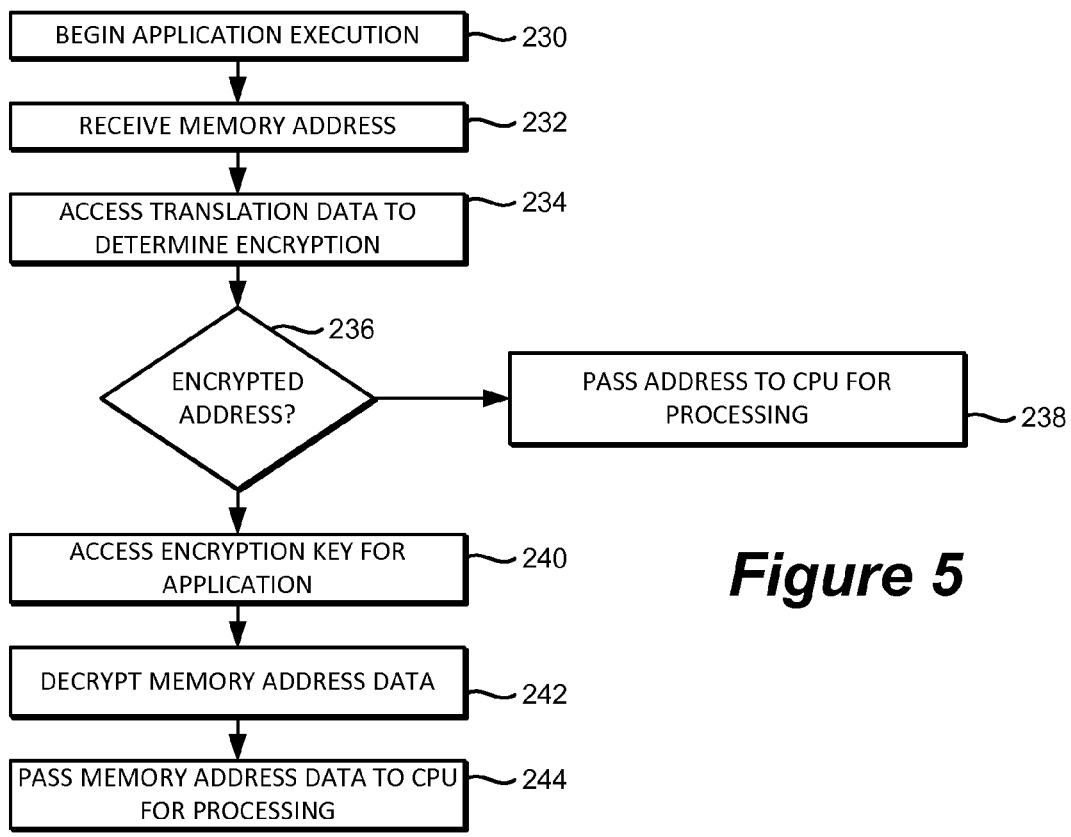
FIG. 5 is a flowchart that describes a process of reverse translating code in accordance with one embodiment.

FIG. 5 is flowchart describing a process of decrypting opcodes in accordance with one embodiment. In one example, FIG. 5 can be performed by a translator 114 at a virtualization layer or at an operating system, for example. At step 230, an application begins execution under the management of a virtualization layer, for example. At step 232, a memory address associated with the application is received. At step 234, the translator determines whether the memory address has been encrypted. In one example, the translator accesses translation data 116 to determine whether the memory address is indicated as having been encrypted. If the memory address is not listed in the translation data, the translator passes the memory location to the CPU for further processing at 238. The translator then waits for additional memory requests associated with the application at step 232.

If the translator determines from the translation data that the memory address is encrypted, the translator accesses the encryption key associated with the application at step 240. At step 242, the translator decrypts the memory address data using the encryption key. At step 244, the translator passes the memory request data to the CPU for processing.

FIGS. 4 and 5 illustrate that code modifications or insertions to applications in application layer 140 are ineffective to exploit computing system 150. With reference to FIG. 4, pre-processor 112 encrypts and stores opcodes for the applications at step 214. If a malicious attacker gains access to main memory to modify or insert code for an application, those insertions or modifications are applied to encrypted application code. Specifically, the insertions or modifications will not have been encrypted or otherwise translated by translator 114. Before the opcodes are passed to the CPU for processing, translator 114 decrypts the opcodes using the encryption. Any code modifications or insertions to an application will also be decrypted or undergo a reverse translation process. This decryption or reverse translation will inhibit any planned exploit from having effect on the computer system 150. In effect, the reverse translation of the modified or inserted code destroys the code. Accordingly, when passed to the CPU for execution, these reverse translated modifications will not effectively execute. In one example, this code will essentially be garbage and cause an exception or error in the code operation. The system may be restarted or other remedial action may be taken.

Although not shown in FIG. 5, one embodiment includes detecting code errors and/or exceptions generated from the execution of reverse translated code modifications or insertions. Shell code examinations or other security analyses can be applied. In some cases, error corrections may be applied to attempt restorations. In one example, any code exceptions or errors can be reported, either locally or across a network to a monitoring facility, for example.

Figure 6:
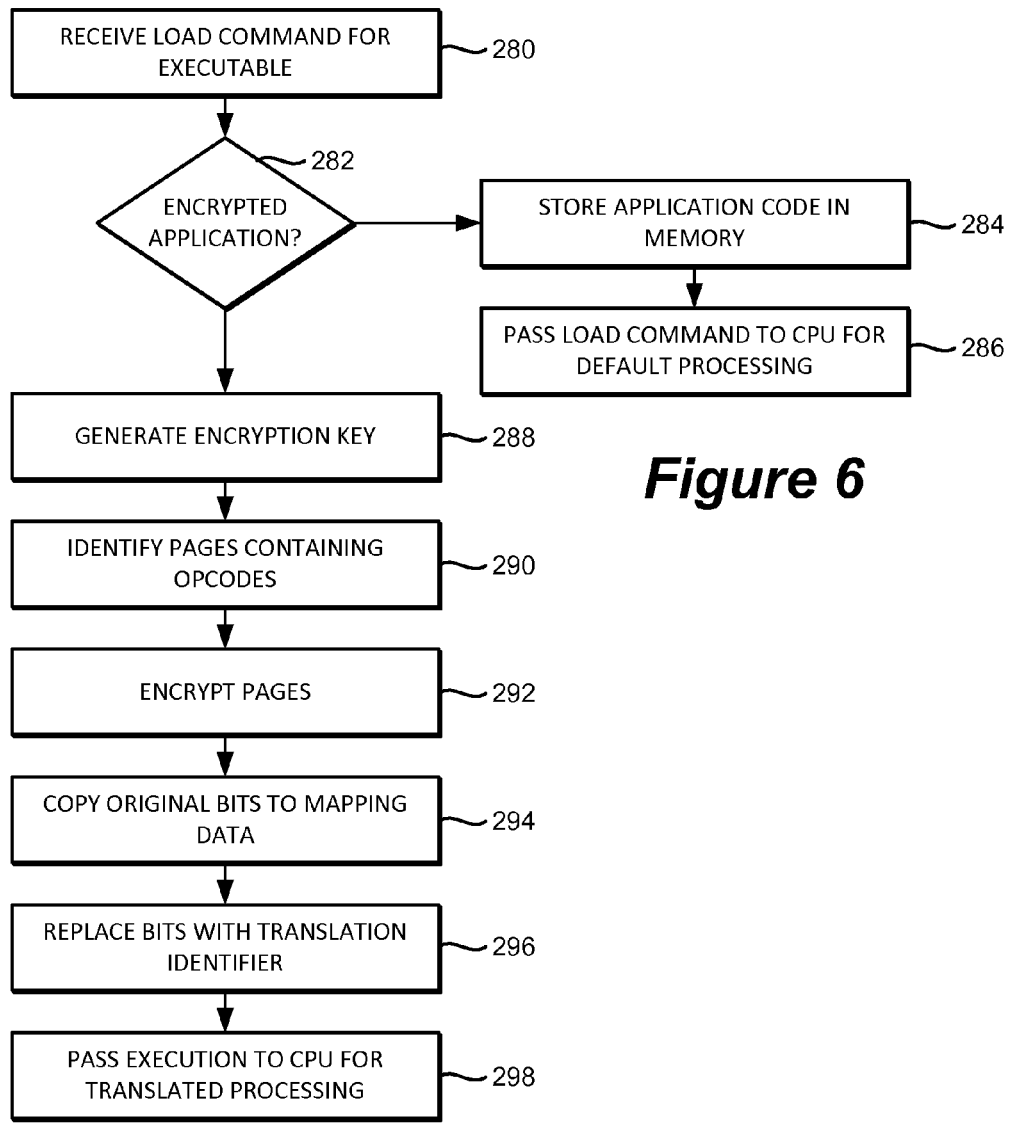
FIG. 6 is a flowchart that describes a process of translating code in accordance with one embodiment.

FIG. 6 is flowchart describing a process of encrypting opcodes in accordance with one embodiment. FIG. 6 can be performed by pre-processor 112 in one example. In FIG. 6, pre-processor 112 uses a page address bit to identify the translations of opcodes in main memory 104. At step 280, a load command for an executable is received. At step 282, the pre-processor determines whether the application is to be encrypted. If the application is not to be encrypted, the pre-processor stores the application code in memory at step 284 and passes the load command to the CPU for processing at step 286.

If the application is to be encrypted, the pre-processor generates or accesses an encryption key for the application at step 288. At step 290, the pre-processor identifies memory pages that contain system opcodes for the application. At step 292, the pre-processor encrypts the pages containing system opcodes using the generated encryption key. In another example, the pre-processor encrypts all pages containing application data. At step 294, the pre-processor copies one or more bits in each page corresponding to a translation identification bit. The original data for these one or more bits are copied and stored in a data mapping 180 portion of memory 104. After copying the original data, the pre-processor replaces the one or more bits in each page to set a flag indicating that the page has been encrypted at step 296. For example, the pre-processor may set a flag or other translation identifier in the first bit of each page that has been translated. At step 298, the pre-processor passes execution to the CPU for translated processing.

Figure 7:
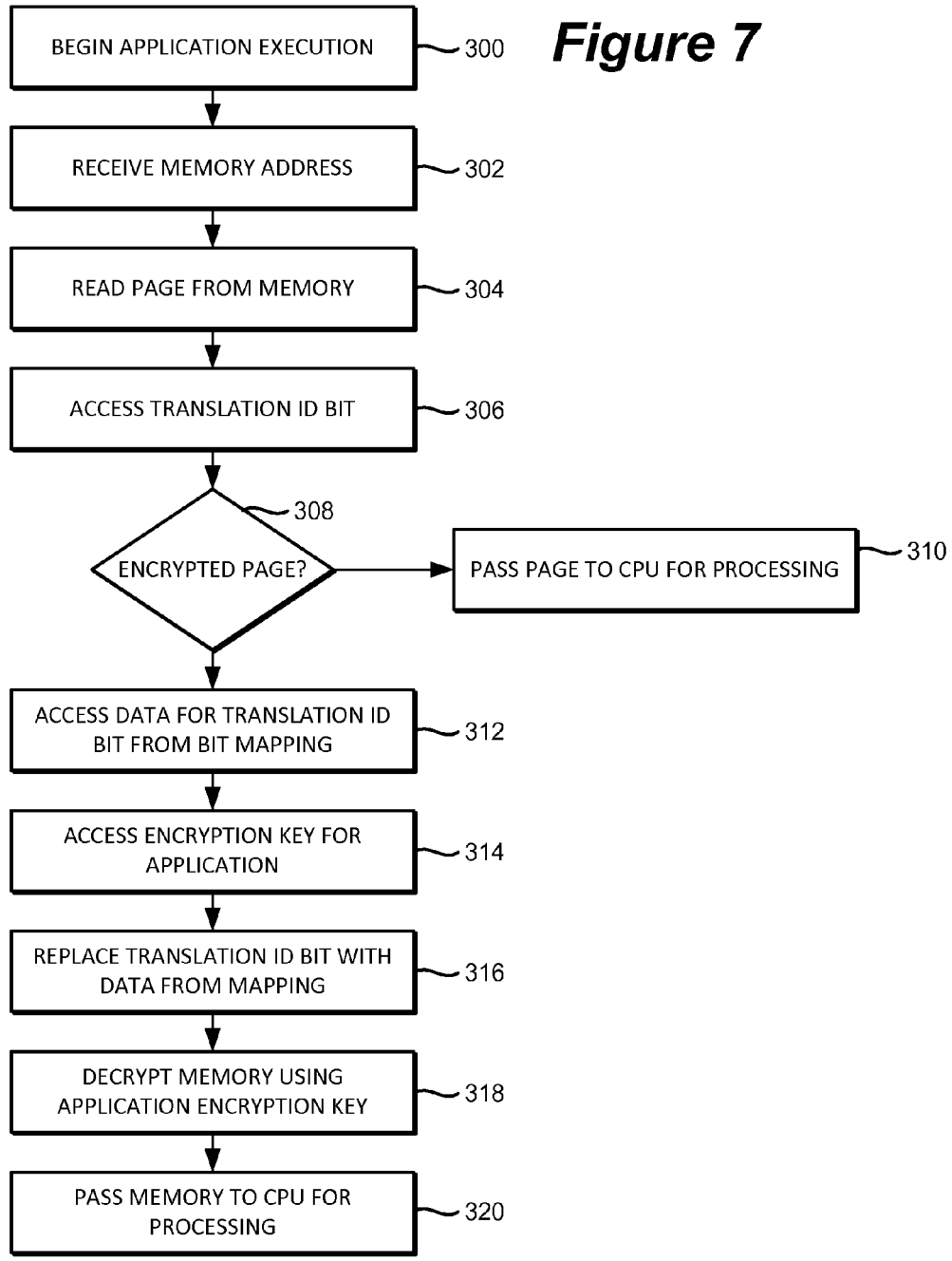
FIG. 7 is a flowchart that describes a process of reverse translating code in accordance with one embodiment.

FIG. 7 is flowchart describing a process of decrypting opcodes in accordance with an embodiment as depicted in FIG. 6, where individual pages are marked to indicate opcode translation. In one example, FIG. 7 can be performed by a translator 114 in a virtualization layer. At step 300, an application begins execution under the management of a virtualization layer, for example. At step 302, a memory address associated with the application is received. At step 304, the translator reads the page associated with the memory address from memory. At step 306, the translator accesses the predetermined translation ID bit or bits from the page. The translator determines whether the page has been encrypted at step 308 based on the translation ID bit. If the page has not been encrypted, the translator passes the page to the CPU for processing at step 310.

If the translation ID bit indicates that the page has been encrypted at step 308, the translator accesses the original data for the translation ID bit from the data mapping 180 at step 312. The translator accesses the encryption key for the corresponding application at step 314. At step 316, the translator replaces the translation ID bit with the data from the data mapping. After replacing the original data into the page, the translator decrypts the page using the application encryption key at step 318. At step 320, the translator passes the decrypted page to the CPU for processing. Other orders of encrypting/decrypting and replacing bits may be used.

Figure 8:
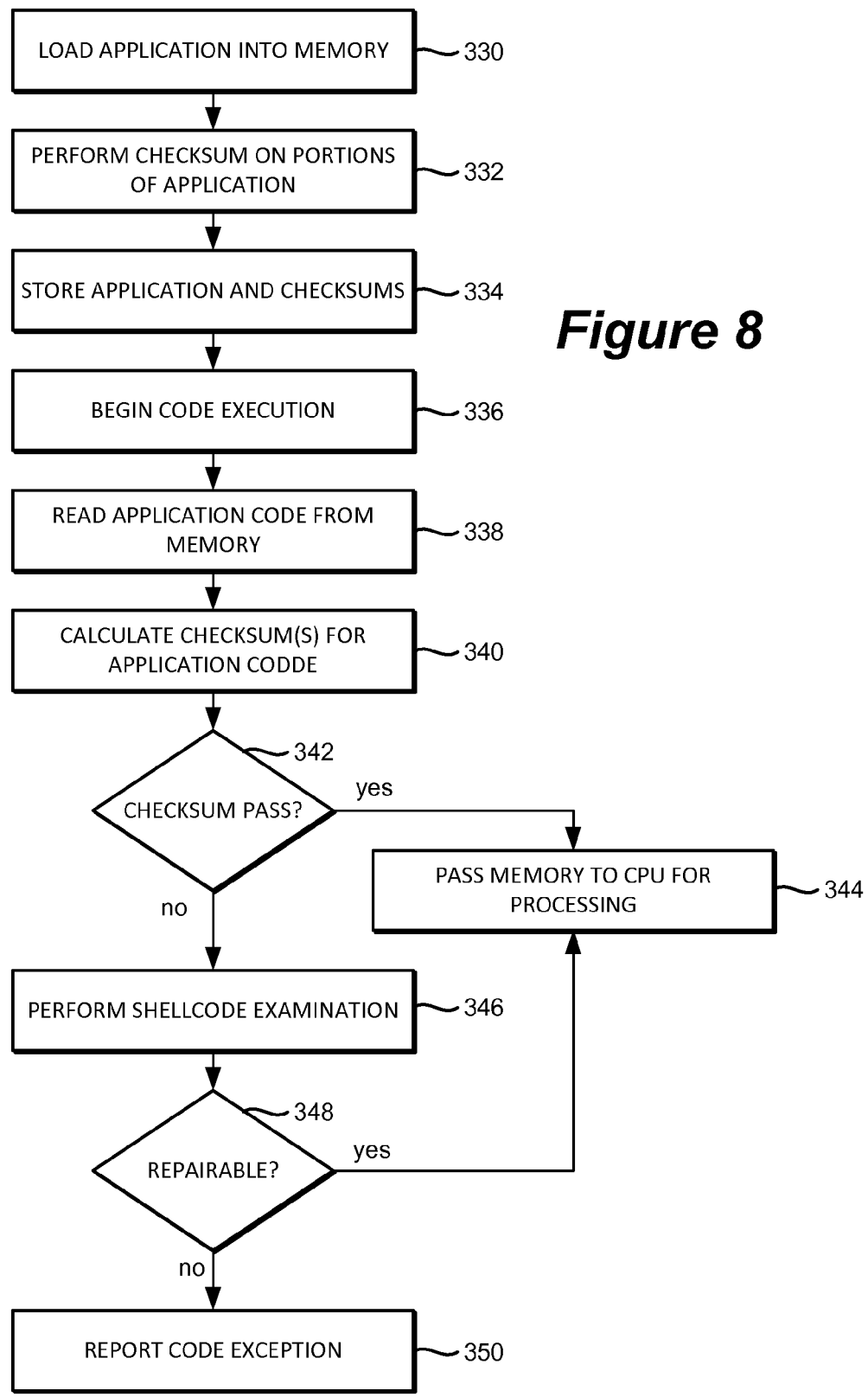
FIG. 8 is a flowchart that describes a process of performing checksums on code in accordance with one embodiment.

FIG. 8 is a flowchart describing another technique for protecting applications in main memory from attacks. At step 330 an application is loaded into main memory, under control of VMM for example. At step 332, a checksum for one or more portions of the application is performed. Other hash-based techniques may be applied to the portions of the application to generate hash values. At step 334, the application and checksums from step 332 are stored in main memory. In one embodiment, steps 330-334 can be performed by pre-processor 112.

At step 336, code for the application from step 330 begins execution. At step 338, application code for the application is read from main memory. Before executing the application code, checksums are again performed for the one or more portions of the application. At step 342, the hash values calculated at step 340 are compared with the hash values stored at step 334. If the hash values match, the memory address data is passed to the CPU for processing at step 344. Steps 338-344 can be performed by translator 114 in one embodiment.

If the hash values do not match, indicating that the checksum has failed, the translator or other components can perform shell code examination or other security analysis techniques at step 346. The modified code can be examined to determine if it is repairable or correctable at step 348 in one embodiment. If the code is repairable, it can be repaired at passed to the CPU for processing at step 344. If the code is not repairable, a code exception can be reported at step 350.

In the embodiment of FIG. 8, checksums are provided to ensure that data has not been manipulated while in main memory. If the data is manipulated while in main memory, its checksum or other computer hash value will not match the checksum value stored before placing the application into main memory. When the system detects that the checksums do not match, the code is not passed to the CPU or otherwise processed, thereby maintaining system validity.

In one embodiment, opcode translations can be performed in advance and delivered to a computing device for storage in translated form for further security. For example, a complete operating system can be translated or encrypted in one embodiment. The translated operating system can then be stored on disk or otherwise delivered to a computing system, e.g, over a network connection. The computing system can be pre-configured with a translator 114 to decrypt or perform reverse translation of the operating system or other application. When the operating system is loaded from disk to main memory, the system can decrypt the operating system using the pre-configured decryption techniques in one embodiment. In another embodiment, the operating system will be decrypted upon execution, for example of individual components of the operating system. In this manner, the complete operating system can be protected from manipulation. Moreover, this technique only requires that a translator be configured on a client computing system. Such an embodiment does not require a pre-processor on the client device. A server or other computer may pre-process the operating system to encrypt it for a pre-configured translator at a client device. In this manner, the client device only has to decrypt the operating system when loaded into main memory at the computer system. In one embodiment, translator 114 can be pre-configured as a hypervisor or other virtualization layer in a CPU.

In another embodiment, the physical opcodes with a central processing unit or other processor are reconfigured. The physical opcode reconfiguration can be maintained and used to pre-process applications for that physical opcode set. In this manner, traditional attack avenues targeting known chipset architectures will be ineffective. In one example, a group of chips can be manufactured with an altered opcode set configuration. Applications can then be pre-processed for execution on the modified opcode set.

Figure 9:
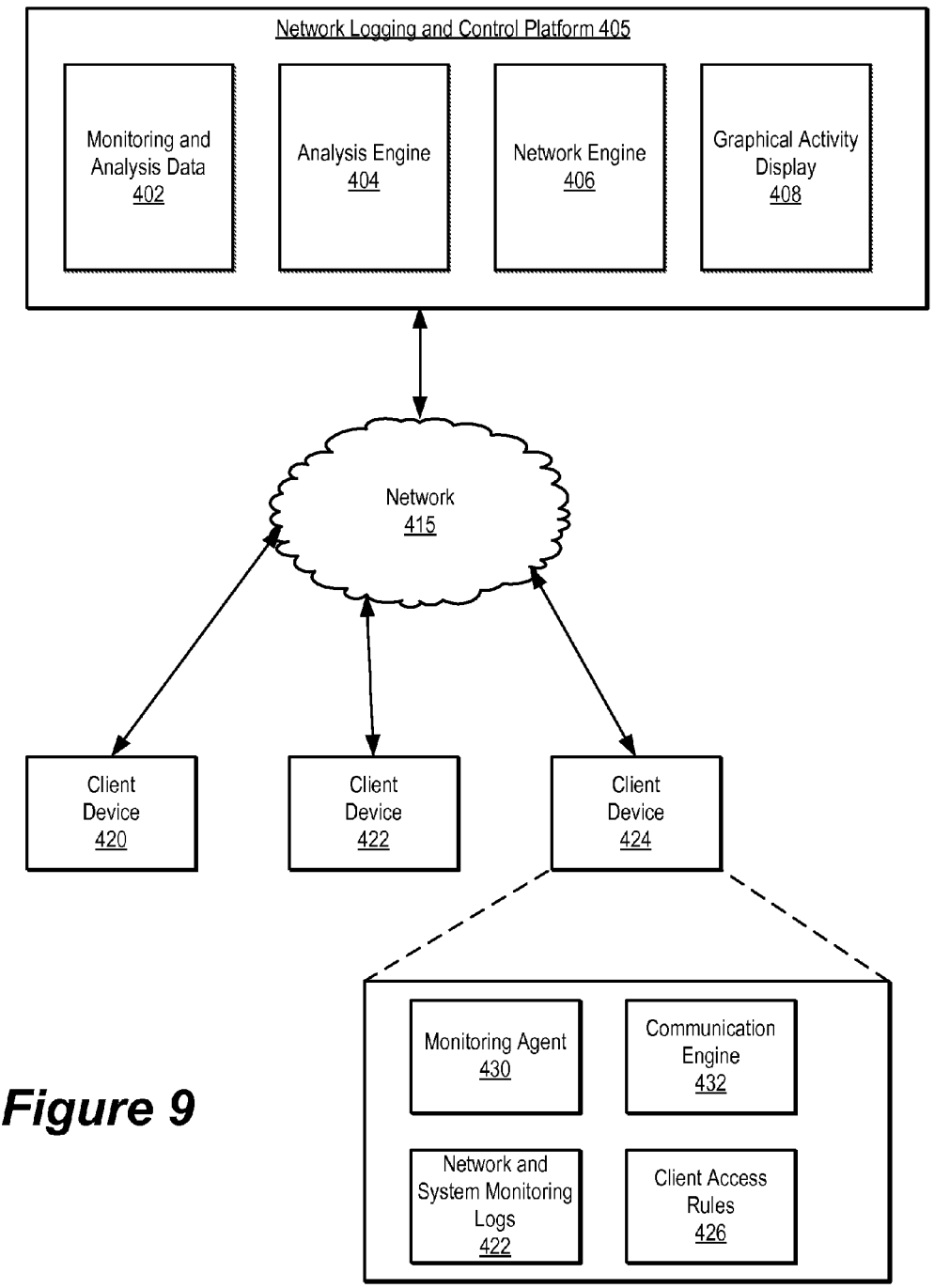
FIG. 9 is a block diagram including a computer network in which embodiments of the disclosure can be implemented.

FIG. 9 is a block diagram including a computer network in which one embodiment may be implemented. In FIG. 9, a network logging and control platform 405 is in communication over one or more computer networks 415 to provide logging and control of activity on client devices 420, 422, 424. Although three client devices are depicted, any number of client devices may be monitored by platform 405. The client devices may reside behind one or more local computer networks in one example.

Platform 405 provides a network engine 406 that communicates with client devices to acquire activity information related to the client devices. As shown with client 424 for example, the client devices may be configured with a monitoring agent 430 and communication engine 432. The communication engine implements an encrypted protocol in one example. The monitoring agent monitors activity on the client device 424 to generate network and system monitoring logs 422. In one embodiment, the monitoring agent 430 monitors file system changes. For example, the monitoring agent may monitor every application's file system tasks to provide a complete overview of system activity at the client device. Creating new files, opening file, changing files, renaming files, and linking files can be logged in one embodiment. Similarly, all registry tasks by applications, including registry entry creations, or modifications of a registry list may be logged. In one example, keyboard idle time, checksums (e.g., MD5 or SHA256), portable executable (PE) signature information, etc. can be logged. In various example, the operating system kernel module may be used to log and generate information.

Monitoring agent 430 may further be configured to provide proxy/hooking on any operating system level. Various configurations to monitor network connections may be provided, for example. In one example, agent 430 may hook functions such as connect( ) closesocket( ) send( ) and recv( ) Other socket or networking-related functions can be hooked or otherwise instrumented from drivers on various operating systems. LSP and/or WFP operating system technologies are utilized for monitoring client device activity in one embodiment. A layer is provided between a network connection and an application providing control over each packet, including filtering, modification, and logging. The layer is used to mitigate exploits by detecting shell code in applications such as javascript for example. For example, heap spray and shell code in the javascript context may be detected. Other file types may be examined. For example, shell code in SWF using AS3 bytecode as shell code may be detected, or shell code within PDF file types.

In one example, the layer analyzes PE or other files before reaching a browser. The files can be analyzed using ClamAV, heuristics, signature verification, etc. The files can be queued for emulation in a sandbox for example, on a remote server. The files can be white listed or blacklisted, for example. In one example, when a new file type is detected on a machine, it is queued for emulation on a remote machine. While the file is queued, a temporary executable is provided to and executed on the client device. The temporary executable may display a progress bar or other indication that the file is being analyzed. Files can be checked for MD5 on virus total or other analysis tools used. If verified, the file can be executed and/or saved to disk as the original.

In one example, agent 430 blocks particular file types. This is performed even in the face of a web server faking http content, for example faking the http content-type header. In one example, 2.0 browser exploitation techniques (including cross site scripting) can be blocked at this layer. In one example, a rule based system is implemented. Sites may be loaded and the layer trained to allow specific CSS parameters for a site. This can prevent compromised sites with newly added scripts loading in the browser context. In one embodiment, agent 430 may be configured to block cross-site scripting (XSS), for example, from the LSP/WFP or other level. The agents 430 may check XSS filter evasion lists. In one embodiment, agent 430 may permit training whereby a website or other resource is accessed during normal operation. During training, website behavior may be characterized. Thereafter, executions that were not present during training or present in the website characterization may be considered potential cross site scripting.

In one example, agent 430 provides targeted attack mitigation. For example, agent 430 can mask or fake a browser type or file system type. Similarly, the agent 430 may mask or fake system types such as these within javascript or other files.

Monitoring logs 422 may contain information such as a list of all programs executing, including any files or registries a program creates, reads or modifies or links, as well as registry tasks. Monitoring logs may include the process executable, an MD5 or other checksum, PE signature, etc. of the program.

In one example, monitoring agent 430 access client access rules 426 indicating what activity is permitted and/or not permitted on the client device 424. In this manner, the monitoring agent can log any activity that is inconsistent with the client access rules. Specific and/or default access rules may be used.

Monitoring agents 430 at client devices provide concealment of agent activity in one embodiment. In one example, an in-memory only run technique is used so that code for an agent 430, or subsets of agent processes, are not written to storage systems such as mass storage 84. In one example, agents 430 include functions that are encrypted on a function by function use. In one example, an agent is inserted into loaded applications. In this manner, insertions to memory can be made without being written to disk (e.g., storage 84).

The control platform 405 may distribute one or more files containing agents 430, communication engine 432, and/or access rules 426. Encryption is provided at the top of functions in one embodiment. In one example, the function is only decrypted at the bottom if an atomic (e.g, interlocked) count is 0. This may provide that multi-threaded applications using the same functions don't experience errors (e.g., crash). In one example, the agents, etc. may decrypt in memory, and the memory be erased on each execution of the functions inside an application. This may enable disguise or hiding of new security measures and the prevention of attacks that attack from client device to client device.

Periodically or in response to pre-determined events, the encrypted protocol engine 432 transmits all or a portion of the monitoring logs 422 to platform 405. Network engine 406 may be used to communication and receive the logs from client devices. In one example, communication engine 432 uses an encrypted protocol on top of ZeroMQ to securely communicate with host platform 405. Network engine 406 can store the monitoring logs in monitoring and analysis data 402. In one embodiment, a backup queue is used in the event platform 405 is unavailable.

In one embodiment, rule sets are utilized for communication between client devices and platform 405. For example, peer to peer communication with applied rule sets may be used. This can enable communication with rule sets not translatable without prior knowledge of the rule sets.

Analysis engine 404 analyzes the log information for multiple client devices. General statistics on client devices can be maintained. Additionally, reports of any violations of client access rules can be generated. The analysis engine may also detect the presence of malicious or unauthorized code on a client device. For example, differing statistics may be used to detect intrusions. In response to such a detection, or after otherwise detecting an abnormality with a client device, the analysis engine can determine from monitoring and analysis data 402 the source of the abnormality, etc.

In one example, analysis engine generates tree-branch type linked graphs for graphical activity display 408. These graphs may contain generations or branches illustrating where code was installed from, and any file or application read, modified or installed. The monitoring and analysis data can be used to determine where code entered a system in question, what application was the entry point of an intrusion, what the intrusion has done on the device, what files the intrusion has accessed, backdoors and/or viruses it may have installed, etc. In response to an intrusion, platform 405 may immediately disable networking for the infected machine, as well as any other machine or client device having files matching those indicating the infection on the first machine. In one example, the client devices have networking disabled using an LSP command from network engine 406. In one example, LSP is used to log every TCP/IP and UDP connection so that any possible intrusions on any number of client devices may be detected quickly. In one example, in response to detecting an intrusion, a while listing of applications for execution only can be enabled on the client device. Any application and/or DLL can be blocked from loading that isn't white listed.

In one example, data 402 is analyzed and an advanced remover is developed and provided to remove the malicious code from the client device. Additionally, the monitoring logs may be used to identify other client devices that also have the same file or piece of code. In this manner, the remover can be provided to those client devices as well. Monitoring may also include monitoring for projection of growth, file space, etc.

Independent of platform 405, or in conjunction with the platform 405, agents 430 are configured in one embodiment for communication with each other for security protection. For example, a group of client devices behind a local network may share information in one embodiment. In another embodiment, a group of client devices may include devices from multiple local networks. Peer to peer networking may be provided in one embodiment. Agents 430 may exchange information and send messages to one another to identify security threats and distribute protections. This may enable communication without using a central server in one example. Client devices 420, 422, 424, etc. may broadcast a message to a local network or group of local subnets requesting hosts with a matching protocol. In one example, the clients may broadcast messages using a broadcast IP such as 0.255. In another example, clients can send UDP packets to IP addresses under the same list or same class (e.g., class C or class B) as the client device.

Peer to peer messaging may provide proactive defense measures for a local network or subnet, for example. Consider an example of client device 422 connecting to client device 424 within a local network. Agent 430 on device 424 may detect the connection and access information relating to the process on device 422 that is utilizing the connection. Agent 430 on device 424 may further access a checksum of this process, a port of the machine on device 422, and an identification of what process started the process accessing device 424. In this manner, agent 430 may proactively detect attacks to device 424 in real time. For example, where an exploit on device 422 is being used to access and attack device 424, agent 430 may detect this. Agent 430 may detect access to a communication port such as a web browser port (e.g., port 80) of device 424. If agent 430 detects that the process connecting to the port is unknown or has no signature, and is not identifiable (e.g, from platform 405), then it may be considered a malicious process (e.g., a possible advancement hack further into a network). Agents 430 my generate logs 430 including information relating to these connections.

Consider another example where client device 422 accesses client device 424 using network sharing, for example. If the devices are sharing a file for example, agent 430 may monitor to determine whether an input device is idle or screen saver is on or another indication that device 422 is idle. If a process attempts a connection in this circumstance where the device 422 otherwise appears idle, agent 430 may determine that the connection is associated with a malicious process. For instance, because the device is idle 422, it may not be expected that the device 422 would make a connection under normal circumstances.

Agents 430 may be configured to detect whether an application making connections is actually visible on a display of the client device. For example, message handles such as Windows Message Handles (WHND) or message handles provided on Mac OSX Aqua/Quartz, used by an application can be detected. Agents 430 may be configured for such detection on any operating system and graphical user interface, including those provided for desktop and mobile devices.

In one embodiment, agents 430 generate logs 422 including information associated with application connections, including message handles, etc. This information can be transmitted to platform 405 for storage in monitoring data 402. In one embodiment, application connection information can be filtered by agents 430 prior to being sent to platform 405, or at platform 405, to reduce the amount of data being transmitted and/or stored. For example, connection information for unknown or unauthorized applications and processes may be stored and sent while other information is discarded. Information for other applications, such as those not set to a particular state, may be logged. Information relating to keyboard and mouse input/output and messages being sent to the message handlers of outside applications can be logged.

Platform 405 may include one or more application and/or web servers and one or more databases 150, for example. The application servers may implement analysis engine 404 and network application engine 406. The analysis engine 404 and network engine 406 may generate system and analysis data 402 and graphical activity display 408 using one or more databases. The servers, client devices and other components of the system may communicate using any combination of networks 415, including local area networks, wide area networks (WAN), the Internet, and/or any other network. Networks typically include at least one public network such as the Internet with the various components communicating using well know communication protocols such as HTTP, HTTPs, etc. The various request and reply messages as described herein can be transmitted using any number of well-known communication and network protocols. They can include a packet, cell, message, or signal used to ask for and receive resources. Some examples include the HTTP communication protocol over a TCP/IP network protocol, HTTPS over SSL, FTP, etc.

Client devices may generally include any type of device such as a personal computer, tablet, PDA, cell phone, or other processor-based computing device. Although databases are described for data storage in FIG. 9 other data storage techniques may be used. For example, the information may be maintained in flat files or other data structures, including unstructured schema-defined data. Embodiments may also be practiced in distributed computing environments where tasks are performed by remote processing devices that are linked through a communications network in a distributed computing environment, with programs located in both local and remote memory storage devices. Although specific components and software modules are depicted, it will be apparent that numerous physical and software based configurations may be employed while remaining within the spirit of the present disclosure. Generally, software and program modules as described herein include routines, programs, components, data structures, and other types of structures that perform particular tasks or implement particular abstract data types. Hardware or combinations of hardware and software can be substituted for software modules as described herein.

In return-oriented programming (ROP), exploits are generated by manipulating a call stack to cause execution of individual machine-level instructions. Sequences of these low-level commands are executed in what are commonly referred to as gadgets. Many functions, in C/C++ and other languages, begin with an instruction such as "Push ebp." These functions generally end with an instruction such as "Pop epb" followed by "Ret." In many instances, ROP exploits are generated using the instructions just before a return within a given function. Many of the instructions can be grouped together to form ROP gadgets.

ROP exploit mitigation is provided in one example using copied and rewritten functions. A load library can be monitored and when an application is loaded, an executable or other program is inserted into the applications in one example. Functions with the application are rewritten to new memory locations. The original functions are modified with jumps or calls to the new memory locations. The original instruction set of each function is at least partially replaced by a ROP detector. In one example, the ROP detector is a call or jump to ROP checker.

Figure 10:
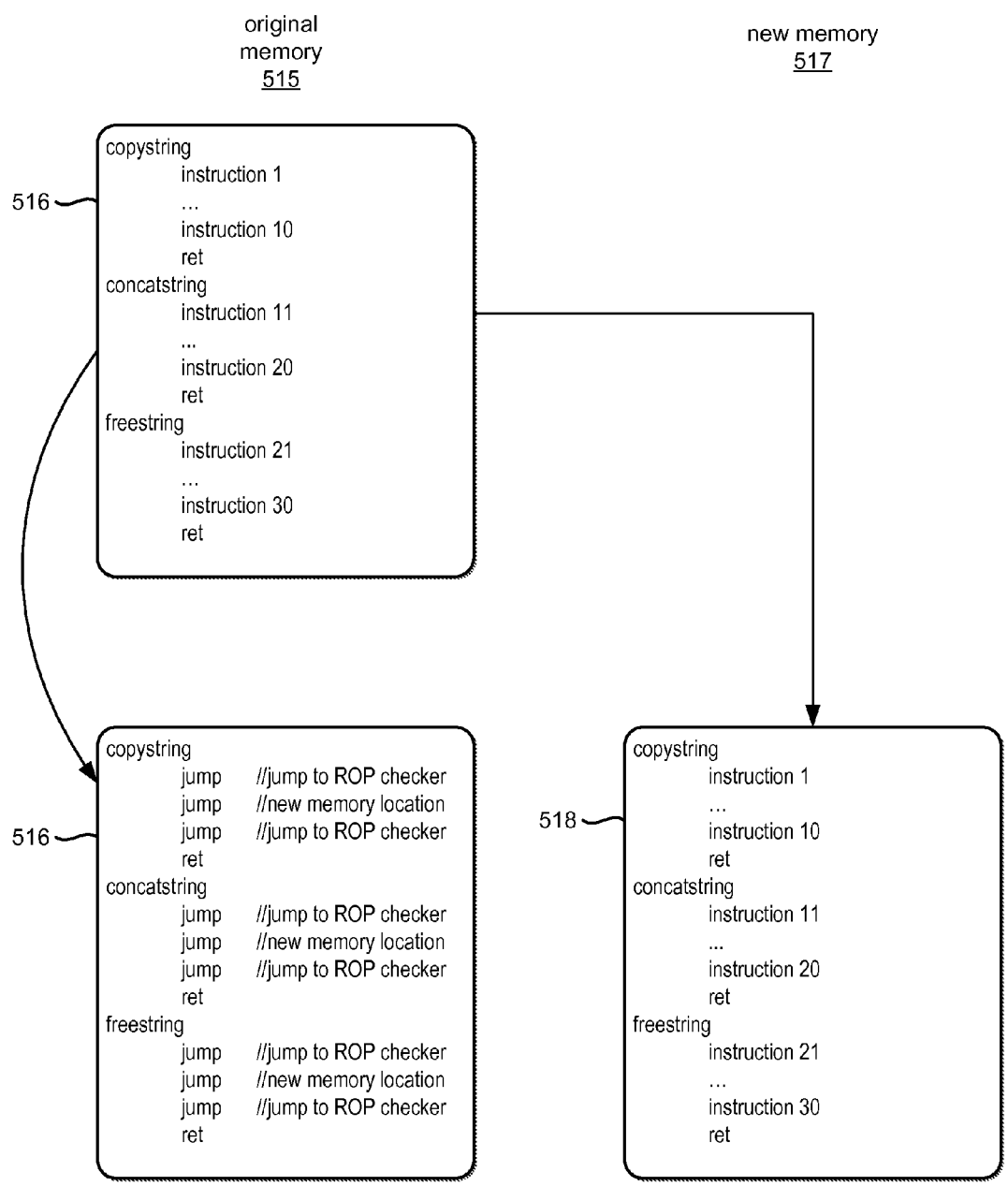
FIG. 10 is a block diagram describing a process for mitigating return-object programming (ROP) in one embodiment.

FIG. 10 is a block diagram describing a process or ROP mitigation in one example. An original code segment 516 is shown in original memory 515. In this example, the code segment includes functions "copystring," "concatstring," and "freestring." Each function is shown with an example instruction set, with ten instructions in each set.

Original code segment 516 is copied to new memory 517, forming a new code segment 518. The original code segment 516 is also modified in original memory 515. At the start or otherwise near the beginning of each function is inserted a first jump or call instruction. This jump instruction refers to the location in new memory 517 of the original function. For example, the first jump instruction within the modified "copystring" function of code segment 516 refers to the location of instruction 1 through instruction 10 in code segment 518 in new memory 517. In this manner, whenever the corresponding function is to be executed, the code will jump or call the code in the new memory location. The code in the new memory location will be executed in place of the original instruction set for the function.

One or more instructions before the return function are then replaced or diverted. In one example, a single instruction is replaced while in other example, any number of instructions can be replaced. The original instruction(s) are replaced with garbage or null instructions in one example that cause non-execution, etc. In another example, just before the return function in each function, a second jump or call instruction is inserted as shown in FIG. 10. Any or all of the original instruction set can be replaced as shown. This second jump instruction references a ROP checker or otherwise generates an alert that the corresponding code has likely been modified. A jump instruction at the top of each function can also be inserted as shown in FIG. 10. The initial jump instruction may avoid alignment issues, where disassembly is not used for example.

Accordingly, by replacing original instruction sets with references to new memory locations of the instructions, and replacing locations likely to be exploited by ROP attacks, protection and proper operation of the system is provided. Attempted ROP exploitation will generate references to the replaced instructions. These replaced instructions will call a module or other instructions to check for ROP exploits or can simply generate or call an alert function. In yet another example, the call will simply cause an exit of the function. Accordingly, rather than calling an intended instruction or instruction set, the attempted ROP exploit will call garbage functions or calls to operations for identifying and/or generating alerts of a ROP attack.

Figure 11:
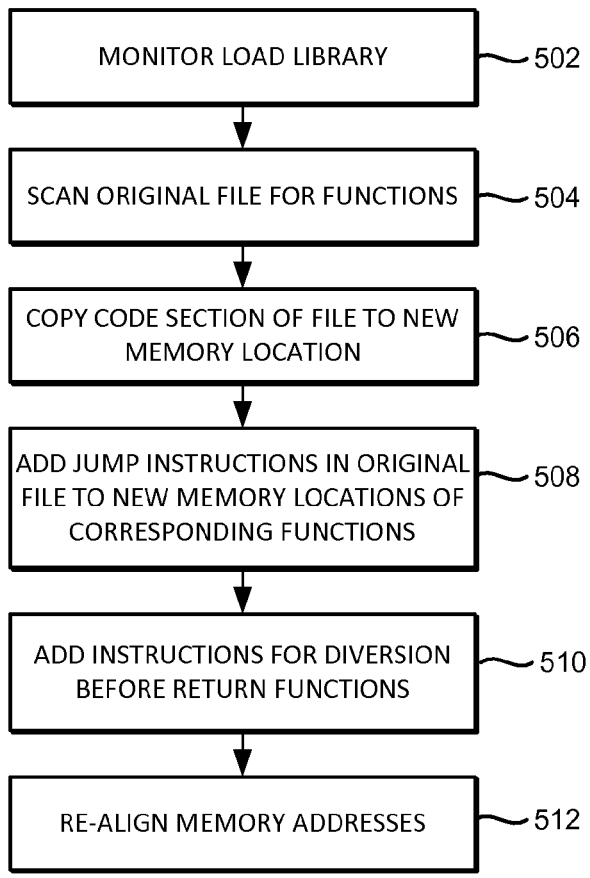
FIG. 11 is a flowchart describing a process of mitigating ROP in one embodiment.

FIG. 11 is a flowchart describing a process of ROP mitigation in one embodiment. At step 502, the load library of a computer system is monitored. In one example, a debugger is used to connect to each application that is loaded. In another example, applications are executed under the control of an agent. For example, applications can be modified or instrumented to include the agent. When a library is loaded, it is scanned for individual functions at step 504. In one example, a list of functions the application uses or exports for use is determined. For example, when a DLL application is being scanned, the PE header can be used to determine a list of functions.

At step 506, the original code sections of each function are copied to a new memory location. After copying each original code section, the original code sections are modified at steps 508 and 510. For each function, a call or jump instruction is inserted at the top or near the beginning of the instruction set for the section at step 508. At step 510, a jump instruction is inserted into the original code segment to divert the function flow before the function returns. For example, the original instruction set of the function is deleted in one embodiment and replaced with a set of garbage or non-operation instructions. In another example, a call or jump instruction is inserted before the function return. The jump can be to an alert that the function is being manipulated or can be to a ROP checker function, for example. The jump can simply cause exit of the function in one example. The diversion causes non-execution of the intended instructions of a would-be attacker. At step 512, memory addresses can be re-aligned if necessary. In one example, re-alignment is performed on the code segments that are copied to new memory locations. In one example, re-alignment is performed on the original modified code. Where relative addressing is used, re-alignments may not be necessary. An extra loop over fix-ups for a code section can be run in one embodiment. In another example, image base relocations can be used. In one embodiment, an assembly re-aligner is used. For example, binary software can be rewritten and rebuilt into an executable or other program file format while fixing memory locations.

Figure 12:
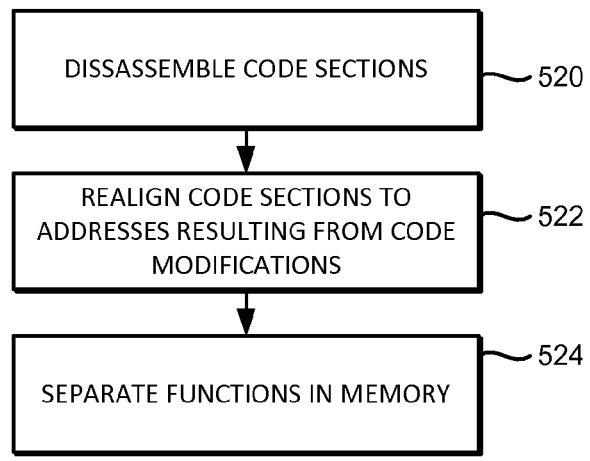
FIG. 12 is a flowchart describing a process of re-aligning code according to one embodiment.

FIG. 12 is a flowchart describing a process of code re-alignment in one embodiment. At step 520, code sections, programs and/or instructions are disassembled. At step 522, each section, program and instruction is re-aligned to a new address after any modifications that were done to instructions above or below. At step 524, the functions can be separated into different parts of memory, although this is not required.

Figure 13:
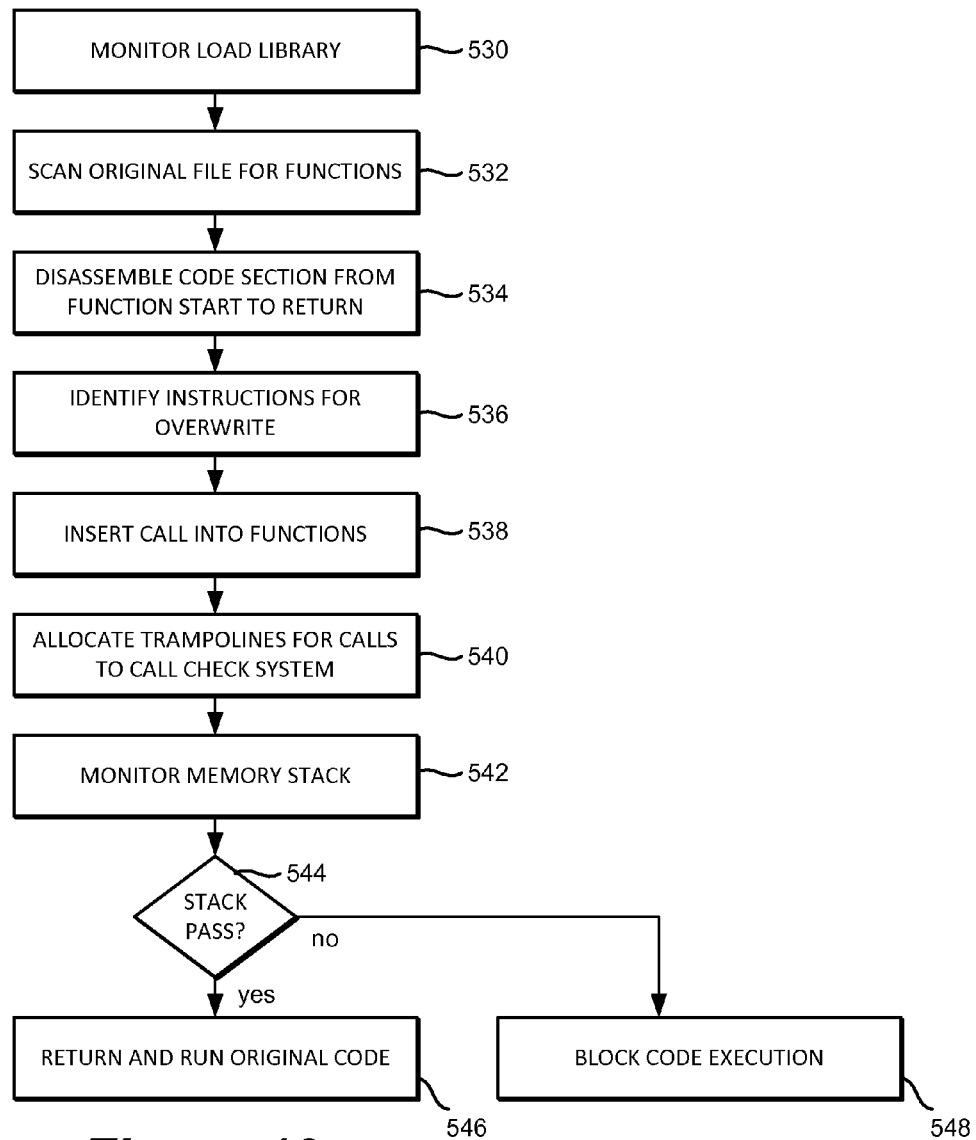
FIG. 13 is a flowchart describing a process of mitigating ROP in one embodiment.

FIG. 13 is a flowchart describing a process of ROP mitigation in accordance with one embodiment. In one example, the process of FIG. 13 monitors a call stack for anomalies indicating a potential ROP attack. At step 530, a load library is monitored. When an application is loaded, the original file is scanned for individual functions at step 532. For each function, the code section from the function start to a return is disassembled at step 534, for example into a set of instructions. At step 536, the disassembled code section is analyzed to identify one or more instructions to be overwritten. For example, a number of instructions needed to instrument a call or jump instruction can be identified. In one embodiment, the number of instructions is a number of instructions preceding the return instruction that is required to implement a call or jump instruction.

At step 538, a call is inserted into each function. In one embodiment, the call is a call directly to a ROP checker system. In another example, one or more trampoline or redirect functions can be used. For example, step 540 depicts allocating one or more trampoline or redirect functions for the calls inserted at step 538. The calls can each point to one or more redirect functions that points to the ROP checker system. At step 542, the call stack is monitored. Step 542 includes waiting for calls generated by the calls inserted at step 538 or 540. When a call is received from the modified function, the call stack can be analyzed to determine if there are any indications of a ROP attack at step 544. If there are any indications of a ROP attack, the stack pass fails. At 548, execution of the potentially modified code is blocked. In one example, step 548 includes executing an exit instruction. In another example, an alert is generated at step 548. If the call stack analysis does not indicate potentially malicious activity at step 544, the system checker can return and run the original code from the function from which the call originated at step 546. In one example, the system checker runs the original code. In another example, the function returns to run the original code and eventually returns to the application's intended execution flow.

In various embodiments, the ROP checker system may implement different techniques for determining whether a call stack indicates a potential ROP attack, as can be used at step 544 example to determine whether the stack passes the ROP check. For example, the call stack can be verified as in a correct memory location in one embodiment. For example, the ROP checker can verify the memory location and determine whether the stack has been moved to somewhere on the HEAP which is a different memory allocation and area of memory, indicating a potential attack. The ROP checker system may disassemble instructions after the return addresses on the stack for a number 'x' returns to determine if the next or section instruction after is a return.

The stack may be tracked or followed all the way up to the top calling function of the stack. In this manner, the original program entry point, or an entry point that was used may be identified. For example, these entry points can be logged by hooking CreateThread, and they can be verified later using a specific thread ID, for example. The ROP checker can determine whether the address on the stack is within that function as it should be in normal operation. The entry point can be disassembled for example, or a thread's initial function from CreateThread can be disassembled. The size of these points can be determined and whether the most parent return address is within this range can be determined. If the address is not within the range, the ROP checker may conclude that the stack has been corrupted. The call stack may also be checked for garbage instructions, for example, as may be implemented in an attack to satisfy "pop ebp" or similar functions. These typically are invalid memory addresses or outside the range that ebp could ever be. EBP is usually a frame of ESP that a function is currently in and therefore, should be close to ESP. If EPB is far from ESPT, it can be determined that the stack has been corrupted.

Database injections, such as SQL, injections are a common way of generating an exploit. Generally, information from a webpage, form or other entry means is used to insert database commands. For example, a form field intended for user input may be used in some cases to inject actual database commands such as SQL commands. In many cases, this may allow the insertion of extra commands into a database, data insertion, and data extraction. In one embodiment, database commands are pre-processed and translated. In response to a database query, the query is scanned for the presence of commands in the original non-translated language which may indicate an attempted injection. Pre-processing may be performed on files, dynamically with web servers or scripting languages, and/or with database clients. If an attempted injection is detected, the query can be sanitized and/or an alert may be generated. This can ensure that any queries are properly escaped and/or filtered before processing.

Figure 14:
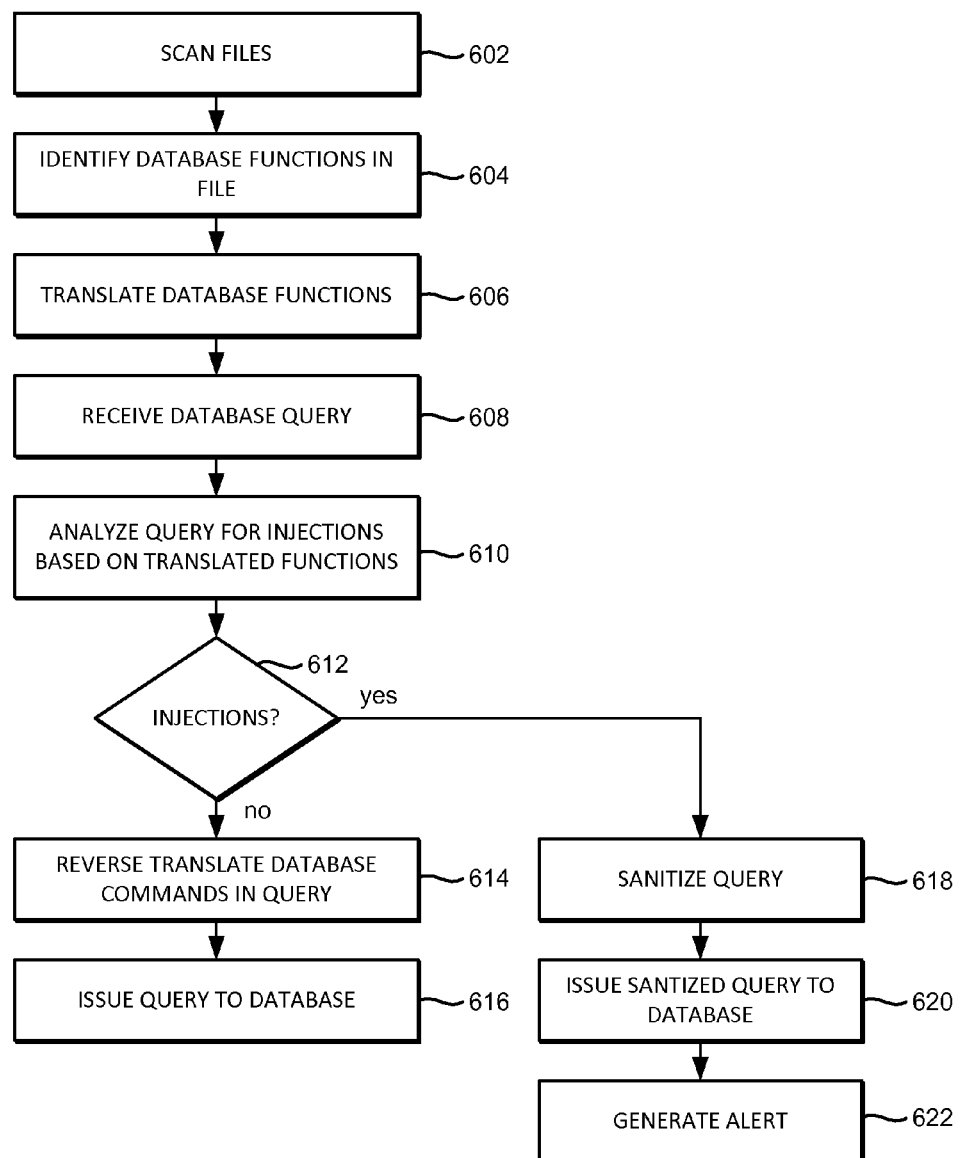
FIG. 14 is a flowchart describing a process of mitigating database command injections in one embodiment.

FIG. 14 is a flowchart describing a process of mitigating database attacks, such as database injections. At step 602, one or more files are scanned for database commands. For example, PHP or any other file types that may contain database commands may be scanned. At step 604, all database commands within each file are identified. At step 606, each database function is translated. For example, each function may be mapped to an alternate form for the database function. The functions may be translated into a different language or expression. After analyzing and translating each file, the files may be stored or immediately used. In one example, files are analyzed and modified as they are loaded into main memory but other techniques may be used. For example, files may be pre-processed. Commands may be converted in the file system of a computer system for example and stored. The pre-processed files may be hosted using a proxy between the database and a web server for example. Files can be pre-processed at an operating system level for all scripting file types. A FastCGI module could be used. In one example, pre-processing is performed on webservers without source code using DLL injection or LD_PRELOAD techniques.

At step 608, a database query is received that is associated with one of the files scanned at step 602. Note that step 602 may occur at any time. At step 610, the database query is analyzed for any database injections based on the translated functions. For example, the query may be analyzed for any database commands in the native or non-translated language of the database command from step 604. Because each of the original database commands was translated at step 606, there should be no commands in the original database command language. Accordingly, step 610 may include determining whether there are injections by determining whether there are any commands in the original database language.

If the system determines that there are injections in the database query at step 612, it attempts to sanitize the query at step 618 and issues the sanitized query to the database at step 620. Steps 618 and 620 are optional. In one embodiment, the system sanitizes queries by removing any database commands and identifying any data responsive to the unaltered query. At step 622, the system generates an alert of a potential attempted database injection. Step 622 is optional. In another example, the system may simply exit or ignore any queries identified as having an injection.

If no injections are detected at step 612, the system reverse translates or otherwise decodes the translated database commands in the query. For example, the system can map the translated commands back to their original commands in the original database language. At step 616, the original database command is issued to the database.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
   determining that a first process is to be loaded into a main memory of a computer system;
   generating an encryption key that is associated with the first process;
   encrypting one or more opcodes for the first process using the encryption key;
   storing the one or more opcodes in the main memory of the computer system;
   updating translation data to identify one or more addresses of the one or more opcodes;
   receiving an execution command associated with the first process;

accessing the one or more opcodes in the main memory using the translation data;
decrypting the one or more opcodes using the encryption key;
providing the one or more opcodes to at least one processor for execution after decrypting the one or more opcodes;
monitoring a load library;
scanning an original file associated with the load library for one or more functions;
copying a code section of the original file to a new memory location;
adding a jump instruction in the original file to the new memory location of the one or more functions;
adding instructions for diversion before one or more return functions; and
re-aligning memory addresses after adding the jump section and instructions for diversion.

2. The computer-implemented method of claim 1, wherein re-aligning memory addresses after adding the jump section and instructions for diversion, comprises:
disassembling one or more code sections;
re-aligning the one or more code sections to addresses resulting from code modifications; and
separating the one or more functions in memory.

3. The computer-implemented method of claim 1, further comprising:
monitoring a load library;
scanning an original file associated with the load library for one or more functions;
disassembling a code section for each function from function start to function return;
identifying instructions to be overwritten in each code section;
inserting a call into the one or more functions;
allocating trampolines for the calls to call a check system;
monitoring a memory stack;
if the memory stack passes monitoring, returning and running the code section; and
if the memory stack does not pass monitoring, blocking execution of the code section.

4. The computer-implemented method of claim 1, further comprising:
scanning a file for database commands;
translating each database command;
receiving a database query;
analyzing the database query for injections based on a translated database command;
if an injection is detected, sanitizing the database query and issuing the sanitized database query to a database; and
if no injections are detected, reverse translating the database query and issuing the database query to the database.

5. A computer-implemented method, comprising:
determining that a first process is to be loaded into a main memory of a computer system;
generating an encryption key that is associated with the first process;
identifying one or more pages of data containing one or more opcodes for the first process;
encrypting the one or more pages of data;
copying one or more bits from each of the one or more pages to one or more new memory locations;
storing the one or more pages of data in main memory with one or more translation identifiers in place of the one or more bits from each of the one or more pages;
receiving an execution command associated with the first process;

accessing the one or more pages in the main memory;
determining from the one or more translation identifiers that the one or more pages should be decrypted;
decrypting the one or more pages using the encryption key;
providing the one or more pages to at least one processor for execution after decrypting the one or more pages; and
replacing the one or more translation identifiers with the one or more bits stored in the one or more new memory locations after determining that the one or more pages in the main memory are encrypted.

6. The computer-implemented method of 5, further comprising:
monitoring a load library;
scanning an original file associated with the load library for one or more functions;
copying a code section of the original file to a new memory location;
adding a jump instruction in the original file to the new memory location of the one or more functions;
adding instructions for diversion before one or more return functions; and
re-aligning memory addresses after adding the jump section and instructions for diversion.

7. The computer-implemented method of claim 6, wherein re-aligning memory addresses after adding the jump section and instructions for diversion, comprises:
disassembling one or more code sections;
re-aligning the one or more code sections to addresses resulting from code modifications; and
separating the one or more functions in memory.

8. The computer-implemented method of claim 5, further comprising:
monitoring a load library;
scanning an original file associated with the load library for one or more functions;
disassembling a code section for each function from function start to function return;
identifying instructions to be overwritten in each code section;
inserting a call into the one or more functions;
allocating trampolines for the calls to call a check system;
monitoring a memory stack;
if the memory stack passes monitoring, returning and running the code section; and
if the memory stack does not pass monitoring, blocking execution of the code section.

9. The computer-implemented method of claim 5, further comprising:
scanning a file for database commands;
translating each database command;
receiving a database query;
analyzing the database query for injections based on a translated database command;
if an injection is detected, sanitizing the database query and issuing the sanitized database query to a database; and
if no injections are detected, reverse translating the database query and issuing the database query to the database.

10. A computer-implemented method, comprising:
determining that a first process is to be loaded into a main memory of a computer system;
performing a checksum on a plurality of portions of the first process;
storing the first process and the checksums;
receiving an execution command associated with the first process;

reading the first process from memory and calculating a checksum for the plurality of portions of the first process;
if the plurality of portions of the first process pass the checksum, passing the first process to at least one processor for execution;
if one or more of the plurality of portions of the first process do not pass the checksum, performing a shellcode examination of the first process;
generating an encryption key that is associated with the first process;
encrypting one or more opcodes for the first process using the encryption key;
storing the one or more opcodes in the main memory of the computer system;
updating translation data to identify one or more addresses of the one or more opcodes;
receiving an execution command associated with the first process;
accessing the one or more opcodes in the main memory using the translation data;
decrypting the one or more opcodes using the encryption key; and
providing the one or more opcodes to at least one processor for execution after decrypting the one or more opcodes.

11. The computer-implemented method of claim 10, further comprising:
determining if the first process is repairable in response to the shellcode examination;
if the first process is repairable, passing the first process to at least one processor for execution; and
if the first process is not repairable, reporting a code exception.

12. The computer-implemented method of claim 10, further comprising:
monitoring a load library;
scanning an original file associated with the load library for one or more functions;
copying a code section of the original file to a new memory location;
adding a jump instruction in the original file to the new memory location of the one or more functions;
adding instructions for diversion before one or more return functions; and
re-aligning memory addresses after adding the jump section and instructions for diversion.

13. The computer-implemented method of claim 12, wherein re-aligning memory addresses after adding the jump section and instructions for diversion, comprises:
disassembling one or more code sections;
re-aligning the one or more code sections to addresses resulting from code modifications; and
separating the one or more functions in memory.

14. The computer-implemented method of claim 10, further comprising:
monitoring a load library;
scanning an original file associated with the load library for one or more functions;
disassembling a code section for each function from function start to function return;
identifying instructions to be overwritten in each code section;
inserting a call into the one or more functions;
allocating trampolines for the calls to call a check system;
monitoring a memory stack;
if the memory stack passes monitoring, returning and running the code section; and
if the memory stack does not pass monitoring, blocking execution of the code section.

15. The computer-implemented method of claim 10, further comprising:
scanning a file for database commands;
translating each database command;
receiving a database query;
analyzing the database query for injections based on a translated database command;
if an injection is detected, sanitizing the database query and issuing the sanitized database query to a database; and
if no injections are detected, reverse translating the database query and issuing the database query to the database.

16. A non-transitory computer readable storage medium having computer readable instructions for programming a processor to perform a method comprising:
determining that a first process is to be loaded into a main memory of a computer system;
generating an encryption key that is associated with the first process;
encrypting one or more opcodes for the first process using the encryption key;
storing the one or more opcodes in the main memory of the computer system;
updating translation data to identify one or more addresses of the one or more opcodes;
receiving an execution command associated with the first process;
accessing the one or more opcodes in the main memory using the translation data;
decrypting the one or more opcodes using the encryption key;
providing the one or more opcodes to at least one processor for execution after decrypting the one or more opcodes;
monitoring a load library;
scanning an original file associated with the load library for one or more functions;
disassembling a code section for each function from function start to function return;
identifying instructions to be overwritten in each code section;
inserting a call into the one or more functions;
allocating trampolines for the calls to call a check system;
monitoring a memory stack;
if the memory stack passes monitoring, returning and running the code section; and
if the memory stack does not pass monitoring, blocking execution of the code section.

17. A computing device, comprising:
one or more computer readable storage media comprising processor readable code; and
one or more processors in communication with the one or more readable storage media, the one or more processors execute the processor readable code to:
determine that a first process is to be loaded into a main memory of a computer system;
perform a checksum on a plurality of portions of the first process;
store the first process and the checksums;
receive an execution command associated with the first process;
read the first process from memory and calculate a checksum for the plurality of portions of the first process;

if the plurality of portions of the first process pass the checksum, pass the first process to at least one processor for execution;
if one or more of the plurality of portions of the first process do not pass the checksum, perform a shellcode examination of the first process;
monitor a load library;
scan an original file associated with the load library for one or more functions;
disassemble a code section for each function from function start to function return;
identify instructions to be overwritten in each code section;
insert a call into the one or more functions;
allocate trampolines for the calls to call a check system;
monitor a memory stack;
if the memory stack passes monitoring, return and run the code section; and
if the memory stack does not pass monitoring, block execution of the code section.

\* \* \* \* \*